Patented Oct. 13, 1953

2,655,498

UNITED STATES PATENT OFFICE 2,655,498

N-BENZHYDRYL-N'ALKYL-SUBSTITUTED-HOMOPIPERAZINES

Arthur W. Weston and Armiger H. Sommers, Waukegan, Ill., assignors to Abbott Laboratories, North Chicago, Ill., a corporation of Illinois No Drawing. Application August 15, 1950, Serial No. 179,636

11 Claims. (Cl. 260—239)

Our invention relates to new chemical compounds and more particularly to certain heterocyclic compounds, containing as the essential substituent a N,N'-disubstituted homopiperazine ring and salts thereof.

The novel compounds of our invention are variously useful. For example, they are generally useful as chemical intermediates and have been found to possess capacity for producing various physiological effects. It has been observed that the compounds according to the present invention are useful in combating the symptoms of histamine activity.

More particularly, the present invention comprises novel N-benzhydryl-N'-alkyl-substituted-homopiperazines, wherein said alkyl group contains up to two carbon atoms inclusive, and particularly the compounds having the following formula:

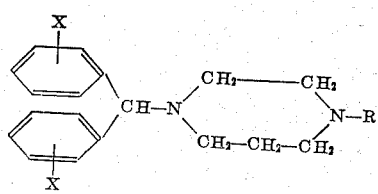

wherein R is methyl or ethyl; and X is hydrogen, halogen, an alkyl group containing from one to four carbon atoms inclusive, or an alkoxy group, the alkyl group of which contains from one to four carbon atoms inclusive; and salts of said compounds.

For therapeutic purposes the preferred compounds of the invention are those wherein R is a methyl group and X is a halogen atom. The more preferred compounds of the invention are the N-(p-halobenzhydryl)-N'-methylhomopiperazines. The most preferred compound is the compound, N-(p-chlorobenzhydryl)-N'-methyl-homopiperazine.

The compounds according to the invention may be prepared by treating: (1) an N-R-homopiperazine with a mono- or di- X(ring-substituted)-benzhydryl halide; (2) an N-monoacyl-homopiperazine wherein the acyl group is formyl or acetyl, with a mono- or di- X(ring-substituted)-benzhydryl halide followed by reduction of the acyl group to the corresponding methyl or ethyl groups with a reducing agent such as lithium aluminum hydride; (3) an N-mono- or di - X(ring-substituted) - benzhydrylhomopiperazine with formaldehyde or acetaldehyde in conjunction with formic acid, in which R as defined above becomes methyl or ethyl respectively. A polymer of formaldehyde, paraformaldehyde, or formalin may be used in place of formaldehyde.

Our invention also comprises the novel process for preparing the novel N,N'-substituted homopiperazines of the invention.

In order more clearly to disclose the nature of the present invention, several specific examples illustrating the preparation of typical compounds will hereinafter be described. It should be understood, however, that this is done solely by way of example and is intended neither to delineate the scope of the invention nor limit the ambit of the appended claims.

EXAMPLE I

*N-(p-chlorobenzhydryl)-N'-methylhomopiperazine*

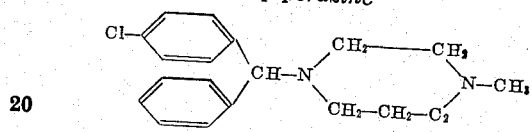

About 4.6 g. (0.04 mole) of N-methylhomopiperazine is dissolved in 20 cc. of anhydrous xylene and to this is added 4.2 g. (0.04 mole) of anhydrous sodium carbonate. While this mixture is being constantly stirred and refluxed, 9.4 g. (0.04 mole) of p-chlorobenzhydryl chloride dissolved in 60 cc. of xylene is added drop-wise. The resulting mixture is stirred and refluxed for two days. After the reaction mixture is permitted to cool, water is added and the mixture extracted several times with dilute hydrochloric acid. The combined acid extracts are made alkaline with a 40% solution of sodium hydroxide. The liberated N-(p-chlorobenzhydryl)-N'-methylhomopiperazine is then extracted several times with benzene. The benzene extracts are combined and concentrated by distillation. The crude residue is purified by distillation at reduced pressure and the fraction boiling at approximately 177° C. at 0.8 mm. pressure is collected.

The dihydrochloride salt of the compound is obtained by dissolving the base in isopropyl alcohol and to this solution is added ethereal hydrogen chloride. The dihydrochloride salt after crystallization from ethanol has a melting point of 227–228° C. with decomposition.

EXAMPLE II

*N-benzhydryl-N'-methylhomopiperazine*

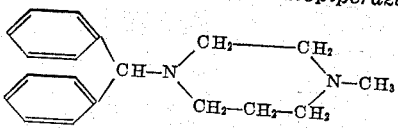

Proceeding as in Example I, but using 1.8 g. (0.016 mole) of N-methylhomopiperazine and 2.1 g. (0.016 mole) of anhydrous sodium carbonate and 0.1 g. of sodium iodide and 4.5 g. (0.018 mole) of benzhydryl bromide, there is obtained the above named compound, having a boiling point of 155° C. at 0.3 mm. pressure. The dihydrochloride salt which is obtained in accordance with the procedure of Example I melts at 235° C. after recrystallization from isopropanol.

It is also advantageous to use 2 mole of N-methylhomopiperazine since increased yields are obtained. For example, by using 3.6 g. (0.032 mole) of N-methylhomopiperazine in the above example, in which case no sodium carbonate is required, substantially greater yields of N-benzhydryl-N'-methylhomopiperazine are obtained.

EXAMPLE III

N-(p-bromobenzhydryl)-N'-methylhomopiperazine

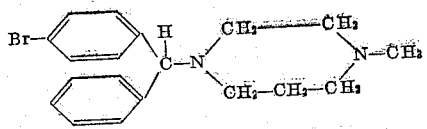

Proceeding in accordance with the process of Example I but using equal molecular proportions of a N-methylhomopiperazine, anhydrous sodium carbonate and p-bromobenzhydryl chloride, the above compound is obtained.

EXAMPLE IV

N-(p,p'-dichlorobenzhydryl)-N'-methylhomopiperazine

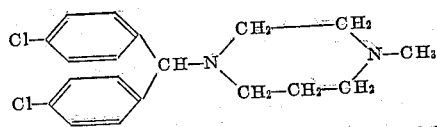

Proceeding in accordance with the process of Example I but using equal molecular proportions of N-methylhomopiperazine, anhydrous sodium carbonate and p,p'-dichlorobenzhydryl chloride, the above compound is obtained.

EXAMPLE V

N-(p-iodobenzhydryl)-N'-methylhomopiperazine

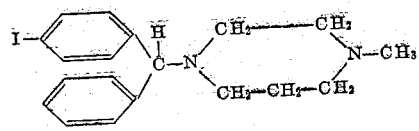

Proceeding in accordance with the process of Example I but using equal molecular proportions of a N-methylhomopiperazine, anhydrous sodium carbonate and p-iodobenzhydryl chloride, the above compound is obtained.

EXAMPLE VI

N-(p-fluorobenzhydryl)-N'-methylhomopiperazine

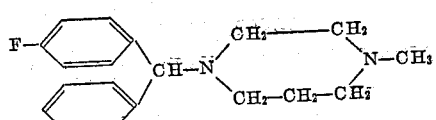

Proceeding in accordance with the process of Example I but using equal molecular proportions of an N-methylhomopiperazine, anhydrous sodium carbonate and p-fluorobenzhydryl chloride, the above compound is obtained.

EXAMPLE VII

N-(o-chlorobenzhydryl)-N'-methylhomopiperazine

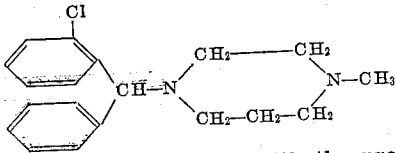

Proceeding in accordance with the process of Example I but using equal molecular proportions of a N-methylhomopiperazine, anhydrous sodium carbonate and o-chlorobenzhydryl chloride, the above compound is obtained.

EXAMPLE VIII

N-(m-chlorobenzhydryl)-N'-methylhomopiperazine

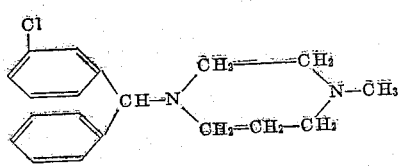

Proceeding in accordance with the process of Example I but using equal molecular proportions of a N-methylhomopiperazine, anhydrous sodium carbonate and m-chlorobenzhydryl chloride, the above compound is obtained.

EXAMPLE IX

N-benzhydryl-N'-ethylhomopiperazine

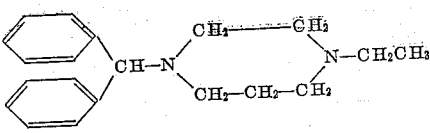

Proceeding in accordance with the process of Example I but using equal molecular proportions of n-ethylhomopiperazine, anhydrous sodium carbonate and benzhydryl chloride, the above compound is obtained.

EXAMPLE X

N-(p-chlorobenzhydryl)-N'-ethylhomopiperazine

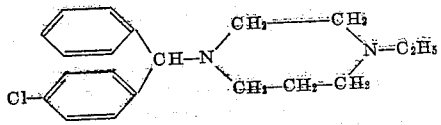

Proceeding in accordance with the process of Example I but using equal molecular proportions of n-ethylhomopiperazine, anhydrous sodium carbonate and p-chlorobenzhydryl, the above compound is obtained.

EXAMPLE XI

N-(p-methoxybenzhydryl)-N'-methylhomopiperazine

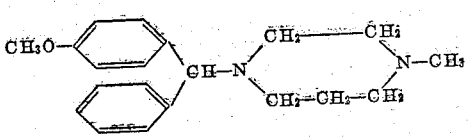

Proceeding in accordance with the process of Example I but using equal molecular proportions of N-methylhomopiperazine, anhydrous sodium carbonate and p-methoxybenzhydryl chloride, the above compound is obtained.

EXAMPLE XII

N - (p-methylbenzhydryl) -N'-methylhomopiperazine

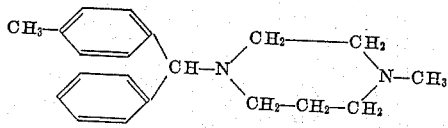

Proceeding in accordance with the process of Example I but using equal molecular proportions of N-methylhomopiperazine, anhydrous sodium carbonate and p-methylbenzhydryl chloride, the above compound is obtained.

It has been found that the addition of a trace of an alkali metal halide, such as sodium iodide, will reduce the reaction time for the preparation of the compounds of the invention, wherein the substituted benzhydryl halide is refluxed with the N-R-homopiperazine. The compounds are produced in excellent yields by this modification of the process. It has also been found that excellent results are obtained by using n-butanol as the solvent. When two moles of N-alkylhomopiperazine are used to each mole of benzhydryl halide, the yields are considerably enhanced. The excess mole of N-alkylhomopiperazine may be easily recovered by fractional distillation.

Compounds may be prepared in which X is an alkyl group containing from one to four carbon atoms and where X is an alkoxy group containing from one to four carbon atoms. For example, where p-n-butylbenzhydryl chloride, p-isopropylbenzhydryl chloride, p-n-butoxy-benzhydryl chloride and p-isopropoxy-benzhydryl chloride are used with N-methylhomopiperazine, the following compounds are obtained: N-(p-n-butyl-benzhydryl)-N'-methylhomopiperazine, N-p-isopropylbenzhydryl-N'-methylhomopiperazine, N-(p-n-butoxybenzhydryl) - N'-methylhomopiperazine and N-(p-isopropoxybenzhydryl)-N'-methylhomopiperazine, respectively.

The following examples are illustrative of the various alternative methods for preparing the intermediates for the final compounds of the invention.

EXAMPLE XIII

N-methylhomopiperazine

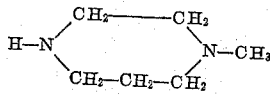

A solution of 5.3 g. (0.041 mole) of 1-methyl-5-homopiperazinone [Dickerman and Lindwall, J. Org. Chem. 14 534 (1949)] in 300 cc. of dry ethyl ether is added with stirring to a solution of 3.8 g. (0.1 mole) of lithium aluminum hydride in 200 cc. of dry ether, under a nitrogen atmosphere. After eighteen hours of stirring, 15 cc. of water is added cautiously to the mixture and the resulting white precipitate is removed by filtration. The filtrate is dried over potassium carbonate and distilled. There is obtained a colorless oil having a boiling point of 74.5° C. at 35 mm. pressure, $n_D^{24} = 1.4755$.

N-ethylhomopiperazine may be prepared in accordance with the procedure of Example XIII by substituting 1-ethyl-5-homopiperazinone for the corresponding methyl compound.

As has been stated earlier in the specification, the compounds of the invention may be prepared by reducing the acyl group of an N-mono- or di- X-(ring-substituted)-benzhydryl-N'-formyl- or acetyl-homopiperazine with a reducing agent such as lithium aluminum hydride. The N-mono- or di- X-(ring-substituted)-benzhydryl-N'-formyl- or acetylhomopiperazine may be prepared by acylating the benzhydrylhomopiperazine with formic acid, acetyl chloride or acetic anhydride, respectively. The N-benzhydryl substituted homopiperazine may be prepared by hydrolyzing and decarboxylating the corresponding N-benzhydryl-N'-carbethoxyhomopiperazine by refluxing with alkali in an alcoholic solution. In turn, the N-benzhydryl-N'-carbethoxyhomopiperazine may be prepared by refluxing N-carbethoxyhomopiperazine with the desired X-substituted benzhydryl halide.

Also, the compounds of the invention may be prepared by treating an N-mono- or di- X-(ring-substituted) - benzhydrylhomopiperazine with formaldehyde or acetaldehyde in the presence of formic acid to produce the corresponding N'-methyl or ethyl substituted compound.

EXAMPLE XIV

N-benzhydrylhomopiperazine

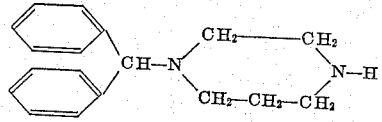

Approximately 1 mole each of N-carbethoxyhomopiperazine, benzhydryl bromide and sodium carbonate are refluxed in xylene to produce N-benzhydryl-N'-carbethoxyhomopiperazine. This compound is then refluxed in alcoholic alkali to produce N-benzhydrylhomopiperazine in good yields. This compound may then be converted into the corresponding N-methyl or N-ethyl compound by converting the N-benzhydrylhomopiperazine to the desired N-acyl compound and reducing with a reducing agent, such as lithium hydride, or alternately by treating with formaldehyde or acetaldehyde in the presence of formic acid.

The novel X - (ring - substituted) - benzhydryl halides may be prepared in accordance with the process disclosed in the co-pending United States application of Weston and Hamlin, Serial Number 86,394.

In the present application the term halogen when applied to substituents in the benzene rings of the benzhydryl group, is intended to encompass fluorine, chlorine, bromine and iodine. When the term halogen is used with reference to the reactive group of the intermediate or other reactants, it does not include the use of fluorine.

The N,N'-disubstituted homopiperazines according to the invention are usually more soluble in water as salts and are therefore administered in the form of water-soluble salts when a rapid effect is desired. Any acid which produces a water-soluble salt and does not appreciably enhance the toxicity is suitable for use. Such acids as sulphuric, phosphoric, hydrochloric, hydrobromic, levulinic, acetic, tartaric and succinic are among those which are satisfactory. Where a retarded effect is desired in obtaining the therapeutic results, salts of other non-toxic acids, such as tannic acid, which are very sparingly soluble in water, may be used. By using the latter salts, the desired pharmacological effect will be slow in onset and relatively long in duration. The water-soluble salts of these compounds of the invention may be satisfactorily administered in the form of water solutions. The bases and water insoluble salts such as the tannic acid salt, as well as the water-soluble salts may be administered in the form of tablets and capsules. The following examples will illustrate these preparations:

EXAMPLE XV

N-(p-chlorobenzhydryl) - N' - methylhomopiperazine dihydrochloride_____gms__ 2
Distilled water, q. s_____cc__ 100

This formula produces an aqueous solution containing 20 mgs. of medicament per cc. The comtpounds of the invention may be dispensed in aqueous solution in suitable concentrations according to this example.

EXAMPLE XVI

The salts of the therapeutic compounds according to the present invention may also be dispersed in the usual tablet and capsule bases and dispensed in tablet or capsule form. Convenient concentrations are 10, 25, 50 or 100 mgs. per tablet or capsule.

Others may readily adapt the invention for use under various conditions of service by employing one or more of the novel features herein disclosed or obvious chemical equivalents thereof. As at present advised with respect to the apparent scope of our invention, we desire to claim the following subject matter.

We claim:

1. N - benzhydryl-N'-alkyl substituted-homopiperazines wherein said alkyl group contains up to 2 carbon atoms inclusive.

2. N - benzhydryl-N'-alkylhomopiperazines of the formula:

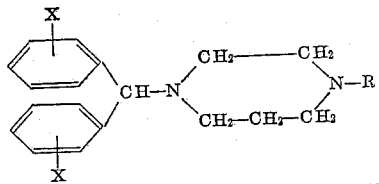

wherein X is a member selected from the class consisting of hydrogen, halogen, alkyl groups containing from 1 to 4 carbon atoms inclusive and alkoxy groups containing from 1 to 4 carbon atoms inclusive and R is a member selected from the class consisting of hydrogen, methyl and ethyl groups.

3. N-halogen-substituted-benzhydryl-N'-methylhomopiperazines.

4. The compound N-(p-chlorobenzhydryl)-N'-methylhomopiperazine.

5. The compound N-benzhydryl-N'-methylhomopiperazine.

6. The compound N-(p-methoxybenzhydryl)-N'-methylhomopiperazine.

7. The compound N-(p-methylbenzhydryl)-N'-methylhomopiperazine.

8. The process of preparing compounds according to claim 2 which comprises; treating N-X-(ring-substituted)-benzhydrylhomopiperazine with a member selected from the class consisting of formic acid, acetic anhydride and acetyl halides followed by reduction of the formyloxy and acetoxy groups formed with lithium aluminum hydride.

9. The process of preparing compounds according to claim 2 which comprises; treating N-X-(ring-substituted)-benzhydrylhomopiperazine with a member selected from the class consisting of formaldehyde and acetaldehyde in the presence of formic acid.

10. The process of preparing an N-benzhydrylhomopiperazine suitable for the process of claim 9, which comprises; treating N-carbalkoxyhomopiperazine with an N-X-(ring-substituted)-benzhydryl halide; hydrolyzing and decarboxylating the resulting product with alkali.

11. The compound N-benzhydrylhomopiperazine.

ARTHUR W. WESTON.
ARMIGER H. SOMMERS.

References Cited in the file of this patent
Albro et al., J. Organic Chem., 14 775 (1949).